(12) United States Patent
Karwath (10) Patent No.: US 7,880,421 B2
(45) Date of Patent: Feb. 1, 2011

(54) ENERGY-CONSERVING VENTILATING FAN (75) Inventor: Arno Karwath, Deisslingen (DE)

(73) Assignee: EBM-Papst St. Georgen GmbH & Co. KG, St. Georgen (DE)

( * ) Notice: Subject to any disclaimer, the term of this patent is extended or adjusted under 35 U.S.C. 154(b) by 958 days.

(21) Appl. No.: 11/736,621

(22) Filed: Apr. 18, 2007

(65) Prior Publication Data

US 2008/0124226 A1    May 29, 2008

(30) Foreign Application Priority Data

Apr. 24, 2006    (DE) .................. 10 2006 020 421

(51) Int. Cl.
*G05D 7/00*    (2006.01)
(52) U.S. Cl. ...................... 318/644; 388/800
(58) Field of Classification Search .......... 318/644; 388/800, 929, 934
See application file for complete search history.

(56) References Cited

U.S. PATENT DOCUMENTS

| | | | | |
|---|---|---|---|---|
| 4,196,628 A * | 4/1980 | Schulze et al. | ............. | 73/865.9 |
| 4,520,844 A | 6/1985 | Finkelstein | ................ | 137/486 |
| 4,806,833 A | 2/1989 | Young | ................ | 318/335 |
| 4,978,896 A | 12/1990 | Shah | ................ | 318/254 |
| 5,019,757 A | 5/1991 | Beifus | ................ | 318/254 |
| 5,269,660 A | 12/1993 | Pradelle | ................ | 417/18 |
| 5,415,583 A * | 5/1995 | Brandt, Jr. | ................ | 454/61 |
| 5,559,407 A | 9/1996 | Dudley | ................ | 318/439 |
| 6,286,326 B1 * | 9/2001 | Kopko | ................ | 62/179 |
| 6,462,494 B1 | 10/2002 | Schöne et al. | ................ | 318/433 |
| 6,517,428 B1 * | 2/2003 | Murray et al. | ................ | 454/56 |
| 6,905,242 B2 * | 6/2005 | Heuer et al. | ................ | 374/142 |
| 2003/0011342 A1 | 1/2003 | Eichorn | ................ | 318/727 |

FOREIGN PATENT DOCUMENTS

| | | |
|---|---|---|
| CA | 2034375 | 9/1991 |
| DE | 82 29 509 U1 | 8/1983 |
| DE | 691 01 216 T2 | 1/1992 |
| DE | 198 04 330 | 8/1999 |
| DE | 299 14 892 U1 | 2/2000 |
| DE | 100 35 829 | 4/2001 |
| DE | 202 20 578 U1 | 2/2002 |
| DE | 101 13 249 | 10/2002 |
| DE | 102 30 242 A1 | 1/2004 |

(Continued)

*Primary Examiner*—Rina I Duda
(74) *Attorney, Agent, or Firm*—Milton Oliver, Esq.; Oliver Intellectual Property LLC (57) ABSTRACT

An electrically driven fan arrangement, suitable for energy-conserving installations, includes a fan, an electric motor (110) serving to drive the fan, and associated control apparatus, namely: a sensing apparatus (140) for sensing a volumetric air flow rate (125) generated by the fan (120) and for generating a measured volumetric air flow value (Vmess), and a volumetric flow rate control arrangement (160) for automatically controlling the volumetric air flow rate (125) generated by the fan (120) to a predetermined target volumetric air flow value (V_s). The volumetric flow rate control arrangement (160) is configured to generate a target rotation speed value (N_s) for the electric motor (110). A rotation speed controller (170), which automatically controls the rotation speed of the electric motor (110) to the target rotation speed rate (N_s) generated by the volumetric flow rate control arrangement (160), is also provided.

25 Claims, 8 Drawing Sheets

FOREIGN PATENT DOCUMENTS

| | | |
|---|---|---|
| DE | 20 2005 001 746 U | 1/2006 |
| EP | 0 681 150 A2 | 11/1995 |
| EP | 1 039 139 B1 | 5/2004 |
| WO | WO 99-40325 | 8/1999 |
| WO | WO 02-075156 A | 9/2002 |
| WO | WO 03-096132 A1 | 11/2003 |

* cited by examiner

ENERGY-CONSERVING VENTILATING FAN

CROSS-REFERENCE

This application claims priority from German application DE 10 2006 020 421.2, filed 14 Apr. 2006, the entire content of which is hereby incorporated by reference.

FIELD OF THE INVENTION

The present invention relates to an arrangement, comprising a fan, adapted for ventilation of an energy-conserving home, office, shop, school, barn, laboratory, or similar structure.

BACKGROUND

Forced ventilation is generally used in energy-conserving buildings, and different volumetric air flow rates are necessary for the ventilation of different rooms, depending on how and when the rooms are used. In a bathroom, for example, a continuous volumetric air flow rate of between 5 liters/second (l/s) and 10 l/s is desirable. When the shower or bath is used, the volumetric air flow rate should then be raised, for example, to 15 l/s, in order to remove excess humidity and to ensure sufficient ventilation of the bathroom. Similarly, in a barn, stable or laboratory, an optimum volumetric flow rate will be higher when the animals are present, and generating methane and humidity, than when the animals are absent. Suitable presence sensors are known in the art and can be used to automatically adjust a target flow rate. Fans having an appropriate power reserve are usually used in this context, to ensure a minimum volumetric air flow rate at different back-pressure values. Such fans, in accordance with their characteristic fan curve, deliver the minimum volumetric air flow rate at a maximum possible back pressure, and a substantially greater volumetric air flow rate at a lower back pressure. If the volumetric air flow rate is too high, however, a great deal of heat is lost, and unnecessary noise occurs, since the fan is always being operated at high speed.

Volumetric air flow rate regulation systems for radial fans having forward-curved blades are known at present since, with these, an unequivocal relationship exists between the volumetric air flow rate and the torque or motor current. The volumetric air flow rate can thus be suitably regulated as a function of the rotation speed and instantaneous power consumption of the radial fans.

Because of their mechanical dimensions and 90-degree air deflection, however, radial fans are generally unsuitable for installation or retro-fitting in already-existing ventilation ducts. Arrangements having axial fans, on the other hand, can usually be integrated directly into already-existing ventilation ducts.

SUMMARY OF THE INVENTION

It is therefore an object of the invention to provide an improved fan arrangement for energy-conserving applications, suitable for retro-fitting into older structures as well as newly-built structures.

According to the present invention, this object is achieved by an arrangement having a fan, in particular having an axial fan, in which a sensing apparatus measures an actual volumetric air flow value, a flow rate control arrangement uses the measured air flow value to generate a target rotation speed value for the fan, and a rotation speed controller automatically regulates the fan speed to match the target rotation speed value. An arrangement of this kind makes it possible to control an electronically commutated motor (ECM), which drives the axial fan, in such a way that the fan generates a substantially constant volumetric air flow rate. To this end, the rotation speed of the ECM is regulated, as a function of a respectively measured volumetric air flow rate of the fan, in such a way that said volumetric flow rate substantially corresponds to a predetermined value.

BRIEF FIGURE DESCRIPTION

Further details and advantageous refinements of the invention are evident from the exemplifying embodiments, in no way to be understood as a limitation of the invention, that are described below and depicted in the drawings. In the drawings.

DETAILED DESCRIPTION

In the description that follows, the terms "left," "right," "top," and "bottom" refer to the respective Figure of the drawings, and can vary from one figure to the next as a function of a particular orientation (portrait or landscape) that is selected. Identical, or identically functioning, parts are labeled with the same reference characters in the various figures, and usually are described only once.

Figure 1:
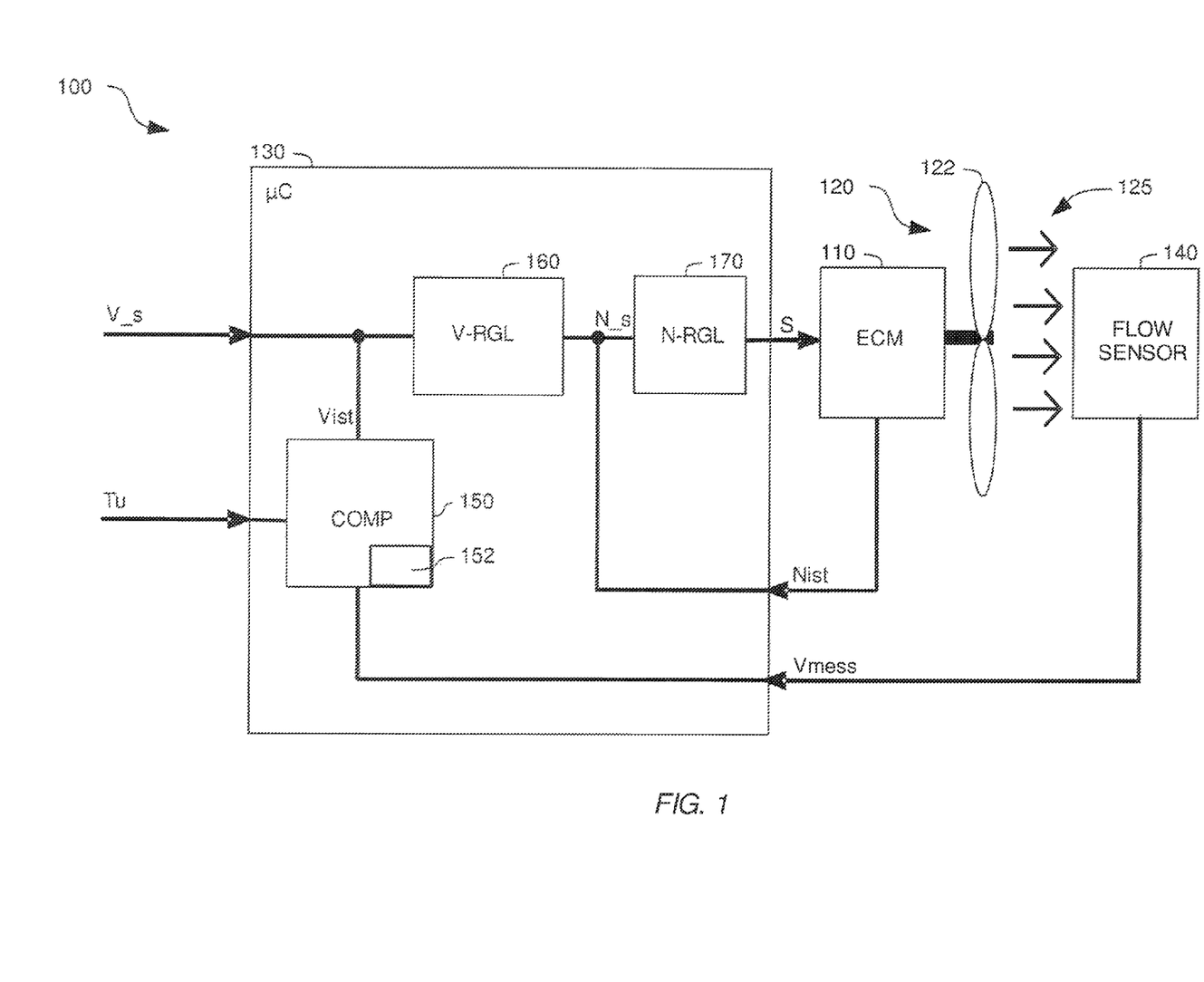
FIG. 1 is a block diagram of a fan arrangement according to an embodiment.

FIG. 1 shows a fan arrangement 100 having a fan 120 that comprises a fan wheel 122. Associated with fan 120, in order to drive it, is an ECM 110 controlled by a microcontroller (microprocessor) µC 130. Microcontroller 130 comprises a temperature and offset compensation arrangement COMP 150, a volumetric flow rate regulating arrangement V-RGL 160, and a rotation speed controller N-RGL 170.

On the input side, microcontroller 130 is connected to a sensing apparatus FLOW SENSOR 140 for sensing a volumetric air flow rate (indicated schematically with arrows 125) generated by fan 120, and also to ECM 110. On the output side, microcontroller 130 is connected to ECM 110. Suitable microcontrollers are available from Microchip, Inc. of Chandler, Ariz. and competing chip vendors.

It is noted that arrangement 150 is shown, by way of example, as a single component. Its functions can, however, likewise be performed by different components that are implemented separately from one another.

Manner of Operation

When arrangement 100 is in operation, fan 120 is driven by ECM 110 and fan wheel 122 is caused to rotate, and generates an air flow 125 in the direction of sensing apparatus 140. The flow rate is sensed by sensing apparatus 140, which generates therefor a measured volumetric flow rate value Vmess.

Value Vmess is generated using an apparatus suitable for that purpose, for example a thermal anemometer or a vane anemometer. An exemplifying thermal anemometer having semiconductor sensors is described below with reference to FIG. 3. An exemplifying vane anemometer having a magnetic sensor is described below with reference to FIG. 4. It is noted, however, that the sensing of volumetric air flow rate 125 and the generation of the measured value Vmess can be accomplished in any manner suitable therefor. For example, instead of the anemometers described, any other anemometer—such as a hot wire anemometer, a vane anemometer having a potentiometer, or a windmill anemometer—can be used to measure toe volumetric air flow rate and to generate the measured value Vmess.

The measured value Vmess and present temperature Tu are applied to temperature and offset compensation arrangement 150. The latter is configured to correct the measured value Vmess upon startup of fan 120 as a function of the present temperature Tu and, during operation of fan 120, to compensate for an offset occurring in the measured value Vmess as a result of sensing apparatus 140. To this end, arrangement 150 comprises a memory unit 152, in which correction values dependent on the present temperature Tu are stored for correction of the measured value Vmess. Upon startup of fan 120, arrangement 150 determines from this memory unit 152, as a function of a respectively ascertained present or instantaneous temperature Tu, a corresponding correction value with which the measured value Vmess is corrected. An exemplifying method for temperature compensation of the measured value Vmess, upon startup of fan 120, is described below with reference to FIG. 6. Examples of correction values are described below with reference to FIG. 8.

During the operation of fan 120, arrangement 150 ascertains, in the context of a predetermined fan rotation speed, the offset of the measured value Vmess generated by sensing apparatus 140, and corrects that offset as a function of the present temperature Tu. The corrected offset is stored as a temperature-compensated offset and added to or subtracted from a respective actual measured volumetric flow rate value, by way of an addition or subtraction operation, for offset compensation. An example of a method for offset compensation of the actual measured value during the operation of fan 120 is described with reference to FIG. 7, and this will make the concept more clear.

The temperature- and offset-compensated measured value Vmess, which is referred to hereinafter as Vist, is logically combined with a target volumetric flow rate value V_s and delivered to control arrangement 160. In this context, for example, a comparison of the two values is made, in order to ascertain a deviation of the value Vist from the target value V_s. As a function of the deviation that is ascertained, arrangement 160 specifies a target rotation speed value N_s for ECM 110.

The target rotation speed value N_s is logically combined with the actual rotation speed value Nist and delivered to rotation speed controller 170. The actual value Nist can be measured or calculated by means of any suitable apparatus for rotation speed sensing, for example utilizing analog or digital rotor position sensors. As regards the logical combination of the two values, by preference a deviation of the actual value Nist from the target value N_s is ascertained. Rotation speed controller 170 uses this deviation to generate a control output S that serves to regulate the rotation speed of ECM 110 to the target rotation speed value N_s generated by volumetric flow rate control arrangement 160.

This allows control to be applied to ECM 110 in such a way that fan 120, regardless of its design, generates a substantially constant volumetric air flow rate.

Figure 2:
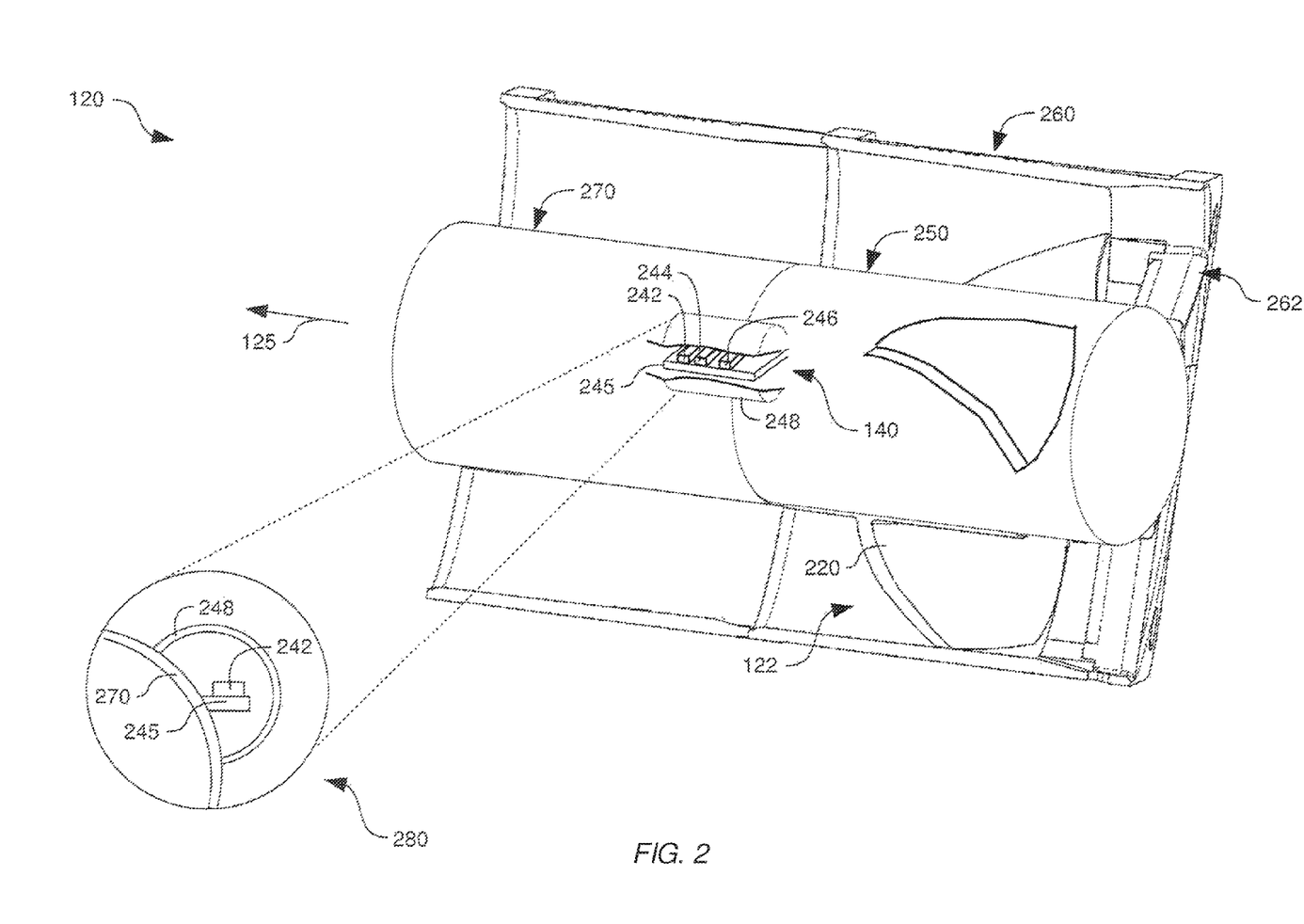
FIG. 2 is a perspective depiction of a fan arrangement having a thermal anemometer, according to an embodiment.

FIG. 2 is a partly-section perspective view of an embodiment of fan 120 of FIG. 1 that is depicted as a so-called tube fan. This has a tube 260 in which the internal stator (not shown) of ECM 110 is arranged in a stator can 270 that is mounted in tube 260 by means of, for example, spokes (not shown). During operation, an external rotor 250 rotates around stator can 270 and therefore around the internal stator; mounted on the periphery of said rotor is fan wheel 122 having fan blades 220 that, during operation, generate volumetric air flow 125 which is transported axially to the left through tube 260. For this reason, such a fan is called an "axial" fan. The inflow side of fan 120, having a protective grid 262, is shown at the right in FIG. 2, and the outflow side on the left.

According to a preferred embodiment, an air-conducting tube 248 is provided at stator can 270, in which tube at least a part of sensing apparatus 140 is arranged. The latter encompasses in FIG. 2, by way of example, a circuit board 245 and two semiconductor sensors 242, 244 arranged thereon for sensing volumetric air flow rate 125, which sensors are part of a thermal anemometer. An example of a thermal anemometer is described below with reference to FIG. 3.

Sensors 242, 244 are not thermally coupled, in order to enable a measurement of the flow velocity of volumetric air flow 125 by way of their differential heating. This thermal decoupling can be enhanced by means of corresponding slots in circuit board 245. The measured volumetric flow rate value Vmess is derived from the flow velocity.

Provided to the right of the two sensors 242, 244 is a temperature sensor 246 that faces toward fan wheel 122 and serves to measure the present temperature Tu. Since any soiling of sensors 242, 244 can have a negative effect on the measurement of volumetric air flow rate 125, and temperature sensor 246 is insensitive to dirt, the latter serves as a dirt catcher for the two sensors 242, 244.

An enlarged detail view of air-directing tube 248 provided on stator can 270, with circuit board 245 and sensors 242, 244, and 246 arranged therein, is shown at 280 in a plan view from the left. Because sensors 242, 244, and 246 are arranged in a line behind one another so that temperature sensor 246 can serve as a dirt catcher for semiconductor sensors 242, 244, only semiconductor sensor 242 is visible at 280.

Air-conducting tube 248 causes a unidirectional air flow to be directed over sensors 242, 244, 246, in order to enable an accurate measurement of volumetric air flow rate 125. This is necessary because at maximum back pressure, air is no longer delivered through tube 260, but a highly turbulent air flow can nevertheless occur in the region of air-conducting tube 248 because of the effect of fan wheel 122. This flow can greatly distort the measurement of the flow velocity and is therefore suppressed by the action of air-conducting tube 248.

Figure 3:
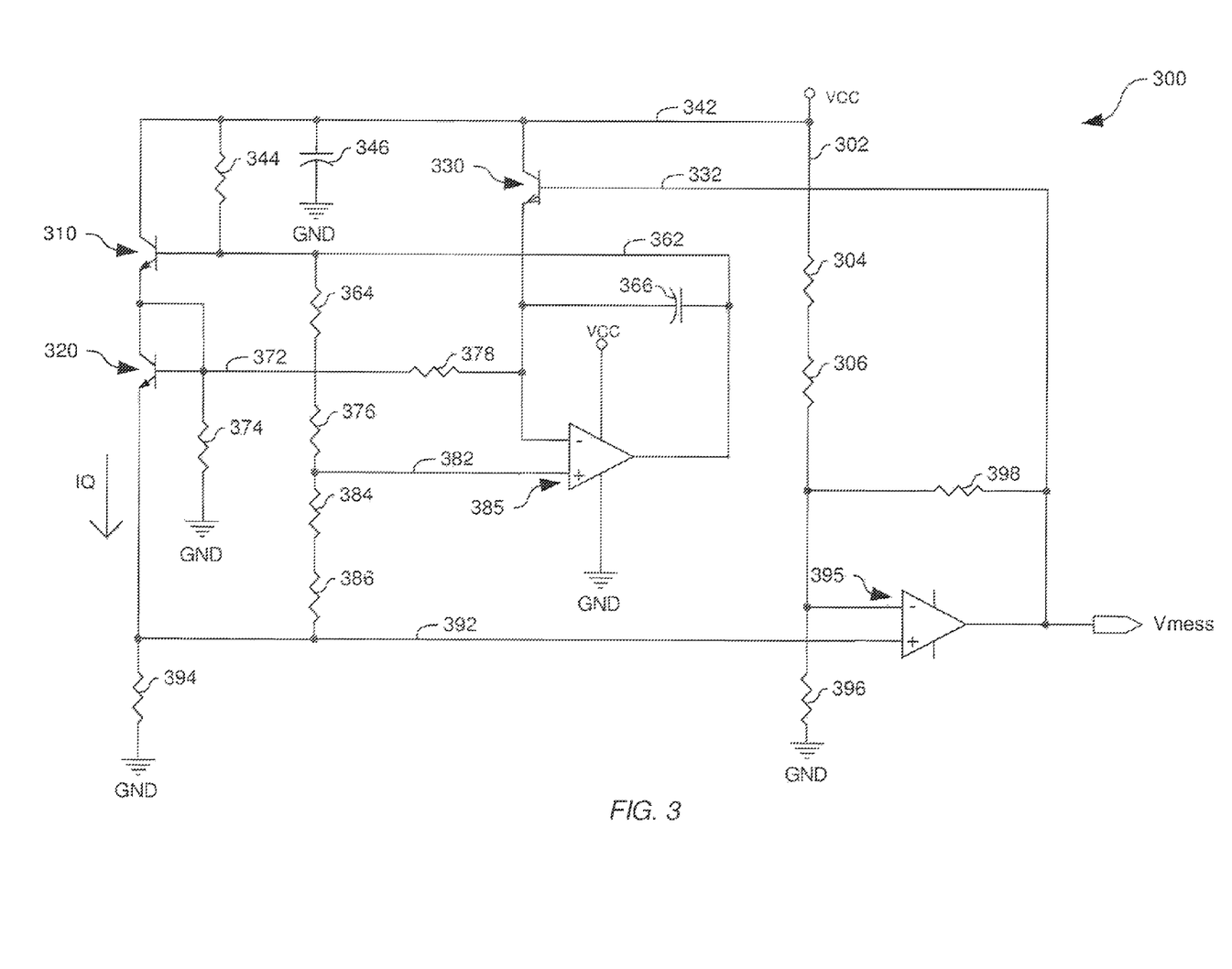
FIG. 3 is a circuit diagram of the thermal anemometer of FIG. 2.

FIG. 3 is a simplified circuit diagram of an example of a circuit 300 with which a thermal anemometer according to a preferred embodiment can be implemented. Circuit 300 comprises two bipolar transistors 310, 320 that serve as semiconductor sensors 242, 244 for the measurement of volumetric air flow rate 125 of FIG. 2.

The collector of transistor 310 is connected on the one hand via a resistor 344 to its base, and on the other hand via a lead 342 to a supply voltage source VCC. Its emitter is connected to the collector and base of transistor 320. Its base is connected via a lead 362 to the output of an operational amplifier 385, and via two series-connected resistors 364, 376 to a load 382 that is connected on the one hand to the non-inverting input of operational amplifier 385 and on the other hand via two series-connected resistors 384, 386 to a lead 392. Power is applied to operational amplifier 385 using supply voltage source VCC and ground GND. The inverting input of operational amplifier 385 is connected via a resistor 378 to the base of transistor 320, which base is connected to ground GND via a resistor 374. The emitter of transistor 320 is connected on the one hand to a lead 392 and on the other hand via a resistor 394 to ground GND.

Load 342 is connected via a capacitor 346 to ground, and also to the collector of an npn transistor 330 whose emitter is connected on the one hand via a capacitor 366 to lead 362, and on the other hand to the inverting input of operational amplifier 385. The transistor's base is connected via a lead 332 to the output of an operational amplifier 395, which output is also connected, via a resistor 398, to its inverting input and at which the measured volumetric flow rate value Vmess is generated. The inverting input of operational amplifier 395 is furthermore connected to VCC via a series circuit of two resistors 304, 306 arranged in a lead 302, and to ground GND via a resistor 396. The non-inverting input of operational amplifier 395 is connected to lead 392.

When circuit 300 is in operation, operational amplifier 385 produces, regardless of temperature-induced changes in resistance and changes in ambient temperature, a predetermined substantially constant temperature difference of, for example, 25° C. between the two series-connected transistors 310, 320 through which a current IQ flows. Operational amplifier 385 achieves this by maintaining a constant ratio between the base-emitter voltages ($U_{BE}$) of transistors 310, 320, the power dissipation of the latter being controlled by influencing current IQ. An approximately square-law ratio exists between IQ and the power consumption of transistors 310, 320.

Because the two transistors 310, 320 carry the same current IQ, their relative energy delivery is determined only by their collector-emitter voltage ($U_{CE}$). Circuit 300 is designed so that during operation, the collector-emitter voltage of transistor 310 ($U_{CE1}$) is greater than the collector-emitter voltage of transistor 320 ($U_{CE2}$). Transistor 310 therefore always absorbs more energy regardless of the magnitude of current IQ, and therefore becomes warmer than transistor 320, which is connected as a diode. When the volumetric air flow rate of fan 120 is then increased, the thermal resistance of transistors 310, 320 decreases, and operational amplifier 385 maintains a constant value of the temperature difference by raising current IQ. This current is sensed by resistor 394 and amplified by operational amplifier 395, at whose output the value Vmess is generated.

In interaction with transistor 330, operational amplifier 395 limits the voltage at resistor 394 to a maximum of 2 V. This prevents a blocking that would occur if the output of operational amplifier 385 were to rise to approximately 5 V. In that case, $U_{CE1}$ would approach $U_{CE2}$ and it would be impossible to achieve the predetermined temperature difference. Resistors 344, 374 similarly prevent blocking when fan 120 is switched on. The square-law ratio existing between IQ and the power consumption of transistors 310, 320 makes a good contribution to linearization.

Figure 4:
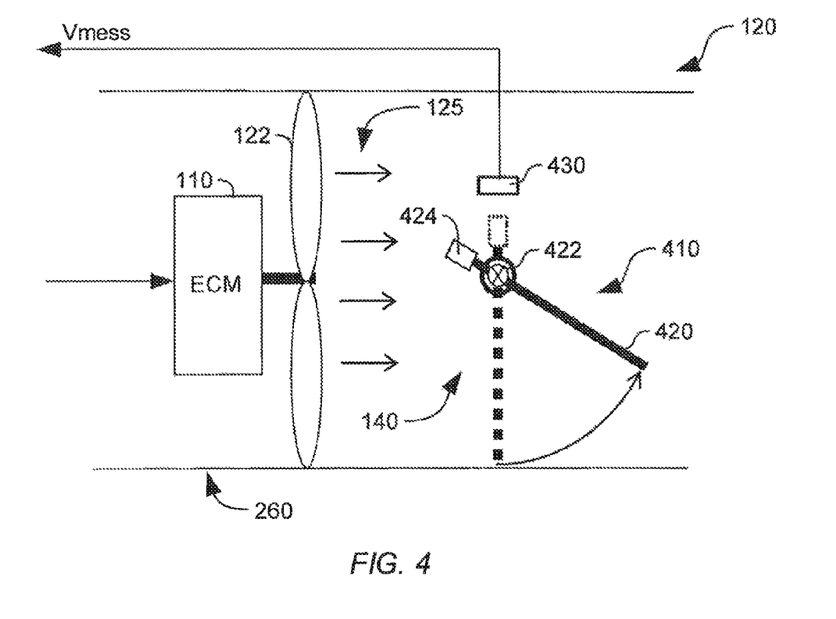
FIG. 4 is a block diagram of a fan arrangement having a vane anemometer, according to an embodiment.

FIG. 4 is a block diagram of a further preferred embodiment of fan 120 of FIG. 1, which is depicted once again in FIG. 4, by analogy with FIG. 2, as a tube fan having the schematically indicated tube 260. Components identical, or functioning identically, to ones in FIGS. 1 and 2 are therefore omitted in FIG. 4—for example, microprocessor 130 of FIG. 1 or temperature sensor 248 of FIG. 2—or are characterized using the same reference characters and are not described again in detail.

FIG. 4 illustrates one implementation of sensing apparatus 140 of FIG. 1 utilizing a vane anemometer 410 and a Hall sensor 430 associated therewith. Vane anemometer 410 comprises an air vane 420 that is joined to a torsional spring 422 and comprises at one end a permanent magnet 424 that generates a magnet field at Hall sensor 430.

During the operation of fan 120, air vane 420 is deflected by volumetric air flow rate 125; the deflection depends on volumetric air flow 125, i.e. the greater the volumetric air flow rate 125, the greater the deflection of vane 420. Torsional spring 422 counteracts the deflection of vane 420 in order to move it back into its rest position.

The deflection of vane 420 is sensed with Hall sensor 430. Because a deflection of vane 420 causes magnet 424 to move away from Hall sensor 430, as is evident from FIG. 4, the field strength of magnet 424 occurring at sensor 430 is a direct indication of the deflection of vane 420. In order to sense this field strength, an analog Hall IC, for example, is used to implement sensor 430; in this, the output voltage or Hall voltage is directly proportional to the field strength. The measured volumetric flow rate value Vmess is derived from this Hall voltage.

By journaling air vane 420 at its center of gravity, fan 120 can be installed in positionally-independent fashion, i.e. without regard to any particular required orientation. In a particularly advantageous embodiment, magnet 424 is implemented here as a counterweight to the weight of the deflectable blade of vane 420.

Figure 5:
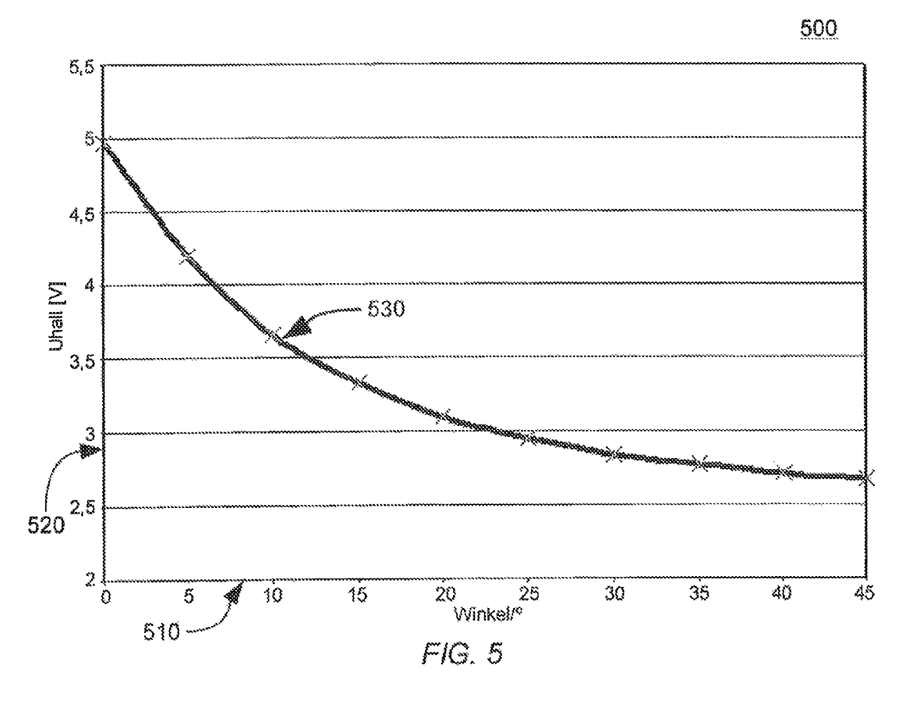
FIG. 5 shows a characteristic curve of the vane anemometer of FIG. 4.

FIG. 5 shows a measurement diagram 500 that illustrates an exemplifying Hall voltage 530, measured with vane anemometer 410 of FIG. 4, as a function of various deflection angles of air vane 420. Corresponding deflection angles are plotted, in degrees, on horizontal axis 510, and Hall voltages measured at the corresponding deflections are plotted on vertical axis 520.

It is evident from FIG. 5 that Hall voltage 530 is maximal when vane 420 is in its rest position, and decreases with increasing deflection.

Figure 6:
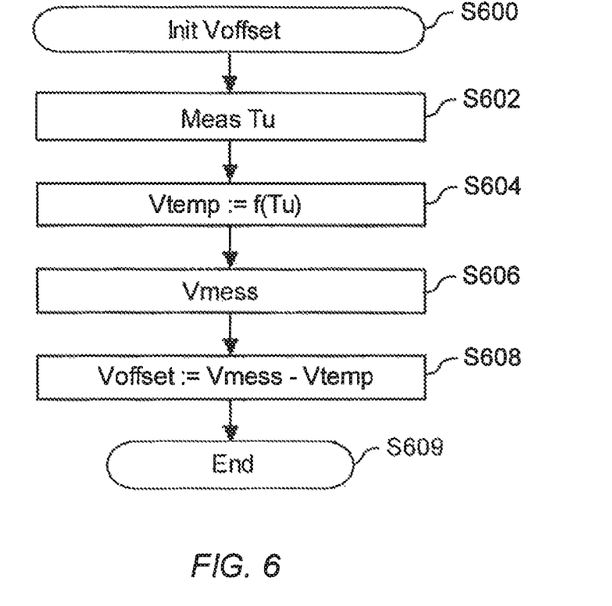
FIG. 6 is a flow chart for an initialization routine of the fan arrangement of FIG. 2 or of FIG. 4.

FIG. 6 shows an "Init Voffset" routine S600 that is executed by temperature and offset compensation arrangement 150 of FIG. 1 at each startup or initialization of fan 120 of FIG. 1, 2, or 4, i.e. when fan wheel 122 is at a standstill. Routine S600 serves to determine a correction value for zero balancing or calibration of fan 120.

Because fan 120 is not in operation upon execution of routine S600, its fan wheel 122 should be at a standstill and the measured volumetric flow rate value Vmess should thus be zero. As a rule, however, a value Vmess that is not equal to zero can nevertheless occur, as a result of component tolerances, i.e. manufacturing variations. Fan 120 is therefore calibrated by the zero-balancing produced by routine S600.

At S602, the ambient temperature is measured by temperature sensor 248 and set as the present temperature Tu.

Figure 8:
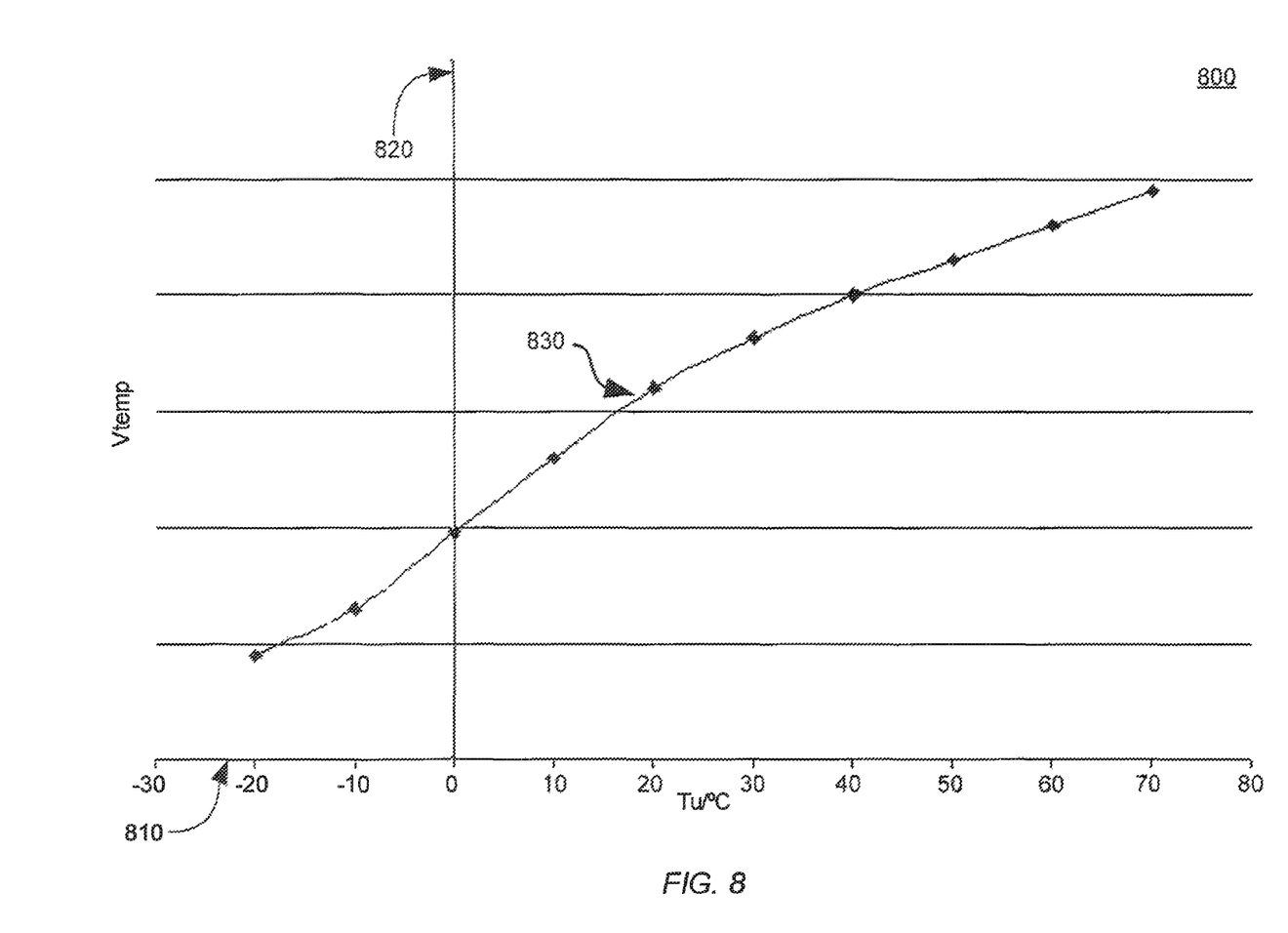
FIG. 8 illustrates an example of a characteristic curve of a correction value necessary in the context of FIG. 6 and FIG. 7.

At S604, a correction value Vtemp associated with the present temperature Tu is determined, for zero balancing of value Vmess, from a table stored in memory unit 152 of arrangement 150. Examples of correction values as a function of corresponding present temperatures Tu are depicted in FIG. 8.

At S606 the volumetric flow rate value Vmess is sensed.

At S608 a corresponding correction value Voffset (where Voffset :=Vmess−Vtemp) is ascertained for zero-balancing. Routine S600 then ends at S609.

Figure 7:
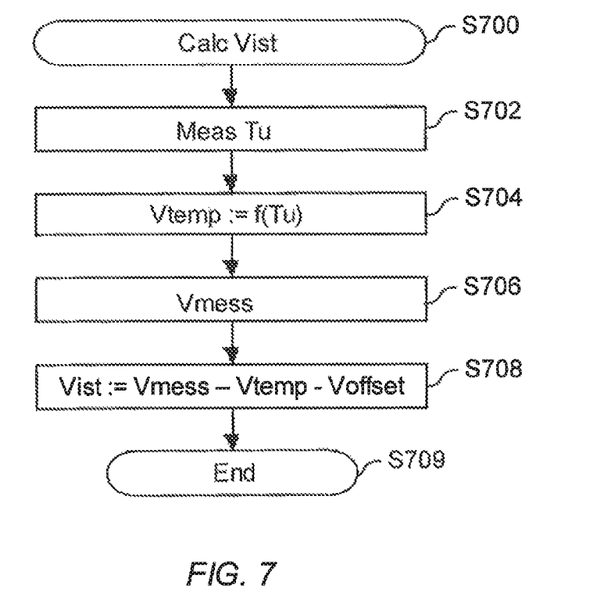
FIG. 7 is a flow chart for a volumetric air flow rate regulating routine during operation of the fan arrangement of FIG. 2 or FIG. 4.

FIG. 7 shows a "Calc Vist" routine S700 that is executed during the operation of fan 120 of FIG. 1, 2, or 4 by temperature and offset compensation arrangement 150 of FIG. 1. Routine S700 serves for temperature and offset compensation of the measured volumetric flow rate value Vmess, which exhibits an error that is dependent on the particular present temperature Tu and, as a rule, rises with increasing temperature Tu.

Analogously with S602 and S604 of FIG. 6, at S702 and S704 a respective present temperature Tu, and a correction value Vtemp associated therewith, are determined.

At S706, analogously with S606 of FIG. 6, the measured volumetric flow rate value Vmess generated by fan 120 is sensed, although this value is not fault-free because of temperature and offset. A temperature and offset compensation is therefore performed at S708.

As is evident from FIG. 7, at S708 the value Vmess is corrected by the correction value Vtemp determined in S704 and by the correction value Voffset determined at S608 of FIG. 6, is this case (by way of example) using a subtraction operation. This yields the temperature- and offset-compensated value Vist, where Vist :=Vmess−Voffset−Vtemp. Routine S700 then ends at S709.

It is noted that routines S600 of FIG. 6 and S700 of FIG. 7 can also be utilized separately from one another. For example, the calibration of fan 120 could already be accomplished at the factory in the context of production. An execution of routine S600 upon startup of fan 120 can in this case be omitted, so that only routine S700 is executed during the operation thereof.

FIG. 8 is a diagram 800 that illustrates an example of a characteristic curve 830 of the temperature profile of the volumetric air flow rate measurement according to embodiments of the invention. Characteristic curve 830 defines the temperature-dependent correction values Vtemp that are utilized in routines S600 of FIG. 6 and S700 of FIG. 7.

As is apparent from FIG. 8, corresponding temperatures in ° C. that represent temperatures Tu are plotted on horizontal axis 810. Correction values Vtemp associated with said temperatures are plotted on vertical axis 820. Said values increase, in accordance with characteristic curve 830, with rising temperature Tu.

Figure 9:
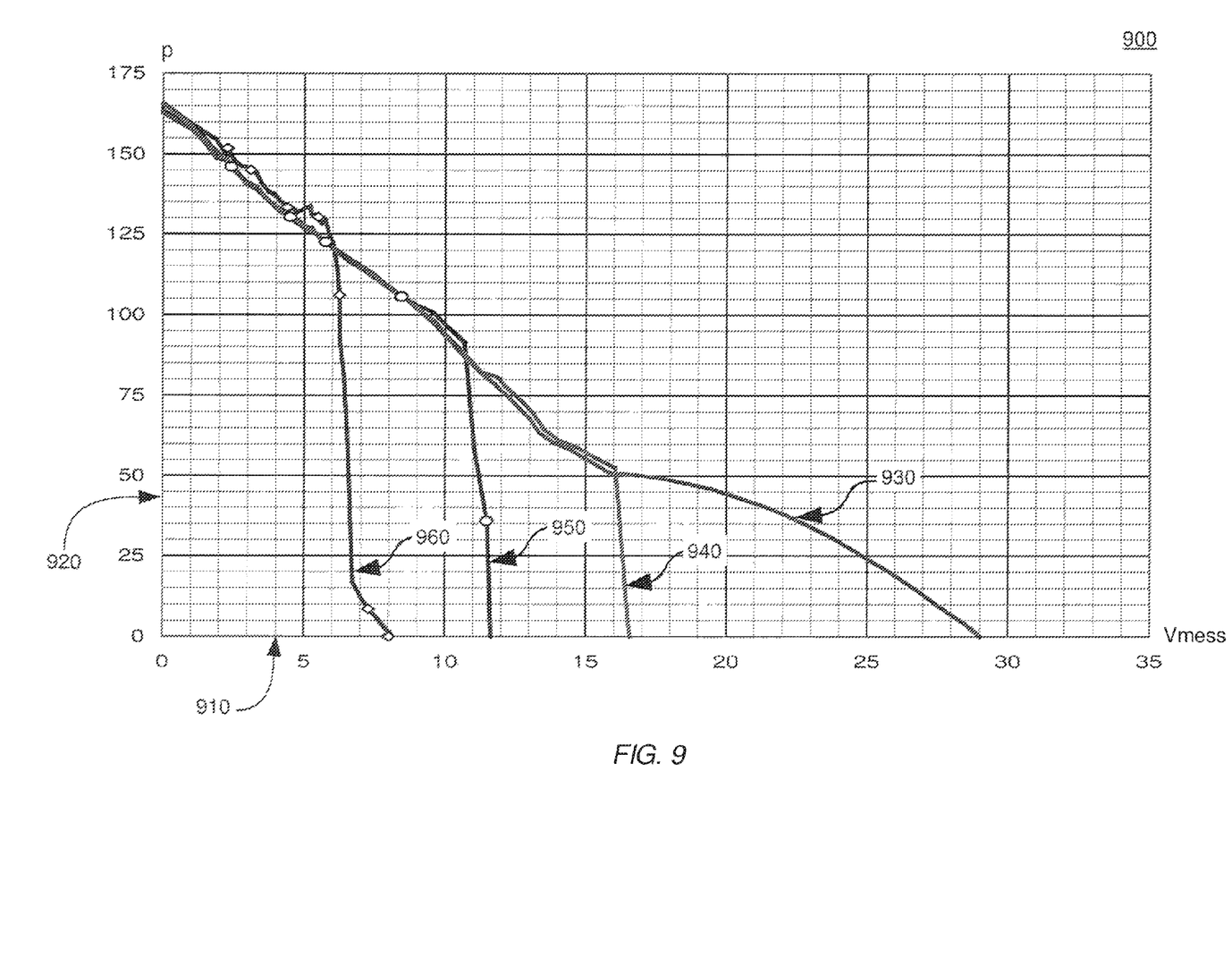
FIG. 9 illustrates an example of a measurement protocol of a fan having a volumetric air flow rate regulation system, according to an embodiment.

FIG. 9 shows an example of a measurement chart 900 of the volumetric air flow generated by fan 120 of FIG. 1, with four different measurement curves 930, 940, 950, 960. The measured volumetric flow rate value Vmess is plotted on horizontal axis 910, and measured back-pressure values Δp are plotted on vertical axis 920.

Curve 930 was measured during operation of the fan at maximum fan speed without automatic volumetric air flow rate control. This curve illustrates the maximum volumetric air flow rate that can be generated by fan 120 at a specific back pressure, which rate is fan-specific. As curve 930 illustrates, the volumetric air flow rate generated by fan 120 is not constant, but varies in inverse proportion to the back pressure, i.e. the greater the back pressure, the lower the volumeric air flow rate that is generated.

Curves 940, 950, 960 illustrate measurements utilizing automatic volumetric air flow rate control as shown in FIGS. 2 to 4, each of these curves being based on a different target volumetric flow rare value V_s. As is evident from these curves 940, 950, 960, the volumetric air flow rate generated by fan 120 is in each case substantially constant up to a certain back pressure.

Figure 10:
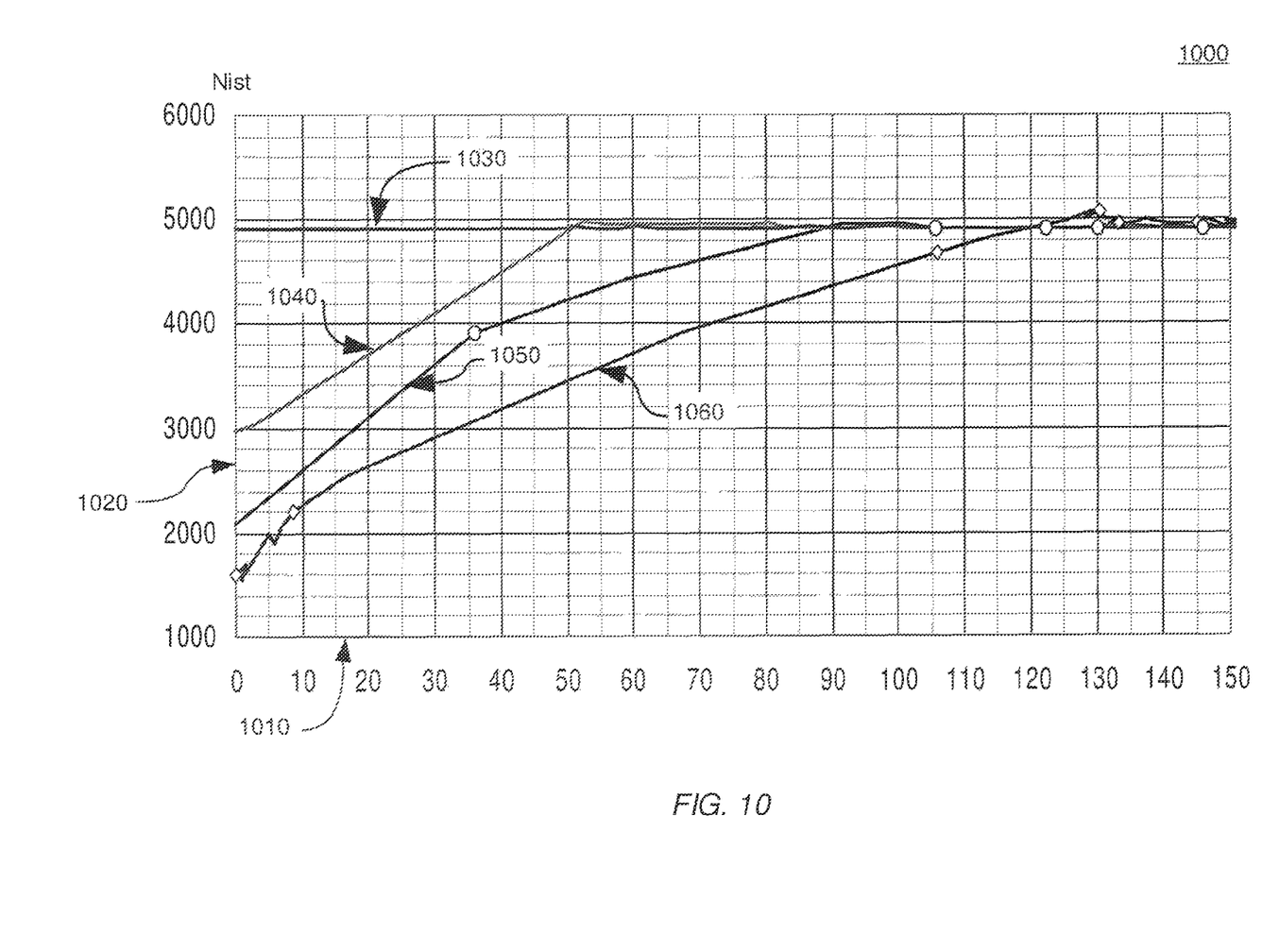
FIG. 10 shows a further example of a measurement protocol of a fan having a volumetric air flow rate control system, according to an embodiment.

FIG. 10 shows an example of a measurement chart 1000 with four different measurement curves 1030, 1040, 1050, 1060 that illustrate the dependence of the actual rotation speed value Nist of fan 120 (plotted on vertical axis 1020) on the back pressure Δp (plotted on horizontal axis 1010). These were respectively ascertained in the context of the measurement of curves 930 to 960 of FIG. 9. Curve 1030 was accordingly measured in the context of operation of the fan at maximum fan speed without automatic volumetric air flow rats control, as a basis for comparison.

Curves 1040, 1050, 1060 illustrate measurements utilizing volumetric air flow rate regulation according to the present invention as shown in FIGS. 2 to 4, each of these curves being based on a different target volumetric flow rate value V_s. As is evident from these curves 1040, 1050, 1060, fan 120 is operated at an increasing rotation speed as the back pressure rises, in order to keep the volumetric air flow rate generated by said fan substantially constant.

Numerous variants and modifications are of course possible, within the scope of the inventive concept.

What is claimed is:

1. A ventilating apparatus adapted for placement in a cylindrical air duct (260), comprising:
   an axial fan (120) having an axial fan wheel (122) dimensioned to fit inside the cylindrical air duct;
   an electronically commutated electric motor (110) serving to drive the axial fan so that, during operation, the fan transports air axially through the duct;
   an air-conducting tube (248) mounted in the duct (260) adjacent the axial fan (120);
   a thermal anemometer (140) in said air-conducting tube for sensing a volumetric air flow generated by the fan (120) and for generating a measured volumetric air flow value (Vmess);
   a volumetric flow rate control arrangement (160) for automatically controlling the volumetric air flow rate (125) generated by the fan (120) to a predetermined target volumetric air flow value (V_s), said volumetric air flow rate control arrangement (160) being adapted to generate a target rotation speed value (N_s) for the electric motor (110); and
   a rotation speed controller (170) which automatically controls the rotation speed of the electric motor (110) to the target rotation speed value (N_s) generated by the volumetric air flow rate control arrangement (160).

2. The apparatus according to claim 1, further comprising:
   a correction arrangement (150) adapted to correct the measured volumetric flow rate value (Vmess) as a function of the instantaneous temperature (Tu).

3. The apparatus according to claim 2, further comprising a temperature sensor (246) for sensing the present temperature, and a memory unit (152) adapted for storing correction values, dependent on the instantaneous temperature (Tu), for correction of the measured volumetric flow rate value (Vmess).

4. The apparatus according to claim 2, wherein the correction arrangement (150) generates, upon startup of the fan (120), a correction value for correction of the measured volumetric flow rate value (Vmess).

5. The apparatus according to claim 1, further comprising an arrangement (150) for offset compensation, which arrangement is configured to determine, during operation of the fan, for each predetermined fan speed, a respective offset value of the sensing apparatus (140).

6. The apparatus according to claim 5, wherein said arrangement (150) for offset compensation is configured to correct the offset as a function of the present temperature (Tu), and to store the offset as a temperature-compensated offset.

7. The apparatus according to claim 5, wherein
the temperature-compensated offset is provided for correcting the measured volumetric flow rate value (Vmess).

8. The apparatus according to claim 7, wherein the arrangement (150) for offset compensation is configured to act upon the measured volumetric flow rate value (Vmess) with the temperature-compensated offset by means of an addition or subtraction operation.

9. The apparatus according to claim 1, wherein
the thermal anemometer (300) comprises at least one semiconductor sensor (242, 244, 310, 320) that has an operating temperature dependent upon the volumetric air flow rate (125) generated by the fan (120).

10. The apparatus according to claim 9, wherein
the at least one semiconductor sensor (242, 244, 310, 320) is arranged in an air-conducting tube (248) which is adapted to produce a unidirectional air flow onto the at least one semiconductor sensor (242, 244).

11. The apparatus according to claim 9, wherein
the thermal anemometer (300) is configure to influence, as a function of the measured volumetric flow rate value (Vmess), a current flowing through the at least one semiconductor sensor (242, 244, 310, 320).

12. The apparatus according to claim 11, wherein
the volumetric flow rate regulating arrangement (160) is configured to influence the target rotation speed value (N_s) for the electric motor (110) as a function of the current (IQ) flowing through the at least one semiconductor sensor (242, 244, 310, 320).

13. The apparatus according to claim 1, wherein
the thermal anemometer (300) comprises two semiconductor sensors (242, 244, 310, 320) and is implemented to maintain, during operation of the fan (120), a substantially constant temperature difference between said semiconductor sensors (242, 244, 310, 320).

14. The apparatus according to claim 13, wherein the two semiconductor sensors (242, 244, 310, 320) are thermally decoupled.

15. The apparatus according to claim 1, further comprising a vane anemometer (410) for measuring the volumetric air flow rate (125) generated by the fan (120).

16. The apparatus according to claim 15, wherein
the vane anemometer (410) comprises an air vane (420) that is deflectable by the volumetric air flow rate (125) generated by the fan (120).

17. The apparatus according to claim 16, wherein the air vane (420) is coupled to a spring (422) that serves to move the air vane (420), against the volumetric air flow rate (125) generated by the fan (120), into an idle position.

18. The apparatus according to claim 16, wherein
the air vane (420) is coupled to a magnet (424) for generating, in a sensor (430) associated with the air vane (420), a signal that is dependent on the local field strength of the magnet (424) generated at the sensor.

19. The apparatus according to claim 18, wherein
the vane anemometer (410) is implemented to ascertain a deflection of the air vane (420), as a function of the signal generated at the sensor (430).

20. The apparatus according to claim 16, wherein
the volumetric air flow control arrangement (160) is configured to influence the target rotation speed value (N_s) for the electric motor (110) as a function of the deflection of the air vane (420).

21. The apparatus according to claim 1, wherein
the air flow rate control arrangement (160) is implemented as a digital controller in a control unit (130) associated with the electric motor (110).

22. A control arrangement for an axial fan (120) adapted for placement in an air duct (260), which axial fan is associated with an electronically commutated electric motor (110) for drive purposes,
said control arrangement comprising:
an air-conducting tube (248) mounted in the duct (260) to cause a locally unidirectional smooth air flow;
an apparatus (140) in the air-conducting tube for sensing a volumetric air flow rate (125) generated by the fan (120), and for generating a measured volumetric flow rate value (Vmess);
an arrangement (160) for controlling the volumetric air flow rate (125) generated by the fan (120) to a predetermined target volumetric flow rate value (V_s),
which volumetric flow rate controlling arrangement (160) is adapted to generate a target rotation speed value (N_s) for the electric motor (110);
a rotation speed controller (170) for automatically controlling the rotation speed of the electric motor (110) to the target rotation speed value (N_s) generated by the volumetric flow rate control arrangement (160).

23. The arrangement according to claim 22, wherein
the apparatus (140) for sensing the volumetric air flow rate (125) generated by the fan (120) comprises a thermal anemometer (300) for measuring the volumetric air flow rate (125) generated by the fan (120).

24. The arrangement according to claim 22, wherein
the apparatus (140) for sensing the volumetric air flow rate (125) generated by the fan (120) comprises a vane anemometer (410) for measuring the volumetric air flow rate (125) generated by the fan (120).

25. The arrangement according to claim 23, wherein
the thermal anemometer (300) comprises two semiconductor sensors (242, 244, 310, 320) and is implemented to maintain, during operation of the fan (120), a substantially constant temperature difference between said semiconductor sensors (242, 244, 310, 320).

* * * * *